(12) United States Patent
Kamijima et al.

(10) Patent No.: US 6,501,618 B1
(45) Date of Patent: Dec. 31, 2002

(54) THIN FILM MAGNETIC HEAD INCLUDING AN ANTIREFLECTION FILM

(75) Inventors: Akifumi Kamijima, Tokyo (JP); Junichi Hokushin, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/522,616

(22) Filed: Mar. 10, 2000

(30) Foreign Application Priority Data

Mar. 15, 1999 (JP) .......................................... 11-067849

(51) Int. Cl.⁷ ............................................... G11B 5/147
(52) U.S. Cl. ...................................... 360/126; 360/317
(58) Field of Search ................................. 360/317, 126

(56) References Cited

U.S. PATENT DOCUMENTS 6,130,805 A * 10/2000 Sasaki ........................ 360/126
6,282,776 B1 * 9/2001 Otsuka ....................... 360/126

FOREIGN PATENT DOCUMENTS

JP     A-9-180127     7/1997

* cited by examiner

Primary Examiner—A. J. Heinz
(74) Attorney, Agent, or Firm—Oliff & Berridge PLC

(57) ABSTRACT

A first magnetic member including a first pole portion and a first yoke portion is formed so as to be supported by a substrate, and a write gap film is formed so as to cover the first magnetic member. A thin film is formed so as to be supported by an insulating film, and thereafter, an antireflection film is formed on the surface of the insulating film including an inclined portion rising on the write gap film. The antireflection film is patterned by a photolithography process so that the patterned antireflection film can remain only on the inclined portion. Then, a photoresist is applied so as to cover the antireflection film and the insulating film, and is processed by a photolithography process for a second magnetic member to form a resistframe having a given enclosed pattern. In the enclosed pattern of the resistframe is formed, so as to cover the antireflection film, the second magnetic member including a second pole portion opposing to the first pole portion via a write gap film and constituting, with the first pole portion, an air bearing surface to oppose to a magnetic recording medium and a second yoke portion magnetically connected to the first yoke portion in the remote position from the air bearing surface. In this way, the thin film magnetic head having the antireflection film between the insulating film and the second pole portion of the second magnetic member can be obtained.

14 Claims, 20 Drawing Sheets

THIN FILM MAGNETIC HEAD INCLUDING AN ANTIREFLECTION FILM

BACKGROUND OF THE INVENTION

1. Field of the Invention

This invention relates to a thin film magnetic head comprising a slider supported by a substrate and a thin film magnetic head supported by the substrate and to a method for manufacturing the same.

2. Related Art Statement

Conventionally, a thin film magnetic head, comprising a first magnetic member including a first pole portion and a first yoke portion, a second magnetic member including a second pole portion opposing to the first pole portion via a write gap film and constituting an air bearing surface opposing to a magnetic recording medium with the first pole portion and a second yoke portion magnetically connected to the first yoke portion in the remote position from the air bearing surface, a thin film coil of which part enclosed by the first and second magnetic members, a coil support-insulating film, and a protection film, is known.

In manufacturing such a thin film magnetic head, generally, a second magnetic film which is to be a top magnetic film is formed after a first magnetic film (bottom magnetic film), a write gap film, an insulating film to support a thin film coil are formed on a wafer. In forming the second magnetic film, a plate-underfilm for the second magnetic film is formed entirely over the wafer including the insulating film by sputtering, for example. Next, a photoresist is applied on the plate-underfilm, and is etched by photolithogrphy to form a resistframe for the second magnetic film. Subsequently, in the area enclosed by the resistframe is formed the second magnetic film by electroplating or the like. A plate film is also deposited outside the resistframe, but is removed later.

One of the problems in the forming process of the second magnetic film is that in the photolithography process to form the resistframe, an exposing light is reflected at the surface of the insulating film and the reflected light exposes the photoresist beyond the area to be defined by a photomask, resulting in the degradation of the pattern precision of the resist frame and thereby the degradation of the pattern precision of the second magnetic film.

The problem become conspicuous in the pole portion of the second magnetic film. The pole portion of the second magnetic film is opposed to the first magnetic film via the write gap film. Backward from the pole portion is positioned the insulating film, which rises up on the write gap film with inclined at a given angle. The rising start point is called as a "throat height zero point", and the rising angle is called as an "apex angle".

The second magnetic film is formed so as to constitute the pole portion parallel to the write gap film and the first magnetic film up to the throat height zero point and be inclined at the apex angle toward the upper surface of the insulating film from the throat height zero point.

Thus, in forming the resist frame for the second magnetic film, the photoresist stuck on the inclined part at the apex angle toward the upper surface of the insulating film from the throat height zero point must be exposed.

In this case, since the plated underfilm is stuck on the inclined part, the light for expose is reflected at the plated underfilm. The part of the reflected light goes toward the pole portion. Thus, the exposed pattern of the pole portion is different from the exposing pattern of the photomask, resulting in the pattern destruction of the resist frame corresponding to the pole portion.

The pattern destruction of the resist frame is a large obstacle for realizing a high recording density by narrowing a recording track width up to 1.0 μm and below, for example.

Kokai publication Kokai Hei 9-180127 (JP A 9-1880127) discloses the technique that before applying a photoresist as a mask for a top magnetic film, an antireflection film is formed, and on the antireflection film is applied a photoresist, which is exposed and developed, to form a resistframe as a mask for a second magnetic film. After forming the resist frame, the antireflection film is removed by ashing or the like and the second magnetic film is formed by plating or the like.

In the above conventional technique, the antireflection film exists over the interior pattern enclosed by the resistframe. The interior pattern of the resistframe has a pole portion area corresponding to the pole portion of the top magnetic film and a second yoke portion corresponding to the yoke portion thereof. Thus, the antireflection film must be removed from both the pole portion area and the second yoke portion.

However, the opening area in the pole portion area is remarkably different from that in the second yoke portion. Moreover, for attaining a high density recording, the opening area of the pole portion area is inclined to be narrowed to a minute size of 1 μm and below, for example. Thus, in removing the antireflection film stuck on the interior pattern enclosed by the resist frame, the etching rate of the second yoke portion is different from that of the pole portion area and it takes longer time in etching the pole portion area than the second yoke portion. As a result, during the removing the antireflection film from the pole portion area, the resist frame is remarkably etched, resulting in the broadening of the resist frame. That is, the removing process of the anti-reflection film to narrow the pole portion width enlarges the space of the resistframe. As a result, the antireflection film impedes to narrow the pole portion width.

SUMMARY OF THE INVENTION

It is an object of the present invention to provide a thin film magnetic head comprising a second magnetic member having a second pole portion formed in a high precise pattern without the pattern deviation due to an undesired reflection of an exposing light in photolithography.

It is another object of the present invention to provide a thin film magnetic having a narrowed recording track width.

It is still another object of the present invention to provide a method for manufacturing the above thin film magnetic head effectively.

This invention relates to a thin film magnetic head including a slider composed of a substrate and a thin film magnetic head element supported by the substrate, the thin film magnetic head element comprising a first magnetic member including a first pole portion and a first yoke portion, a second magnetic member including a second pole portion opposing to the first pole portion via a write gap film and constituting, with the first pole portion, an air bearing surface to oppose to a magnetic recording medium, and a second yoke portion magnetically connected to the first yoke portion in the remote position from the air bearing surface, a thin film coil of which part is surrounded by the first and second magnetic members, a coil support-insulating film to support the thin film coil, a throat height zero point-defining insulating film rising on the write gap film so as to define the throat height zero point, and an antireflection film between the rising-inclined portion of the throat height zero point-defining insulating film and the second pole portion of the second magnetic member.

This invention also relates to a method for manufacturing a thin film magnetic head including a slider composed of a substrate and a thin film magnetic head element supported by the substrate, the thin film magnetic head element having a first magnetic member including a first pole portion and a first yoke portion, a second magnetic member including a second pole portion opposing to the first pole portion via a write gap film and constituting, with the first pole portion, an air bearing surface to oppose to a magnetic recording medium and a second yoke portion magnetically connected to the first yoke portion in the remote position from the air bearing surface, a thin film coil of which part is surrounded by the first and second magnetic members, a coil support-insulating film to support the thin film coil, and an antireflection film between the coil support-insulating film and the second pole portion of the second magnetic member, comprising the steps of:

forming the antireflection film on the surface of the coil support-insulating film including an inclined portion rising on the write gap film after forming the first magnetic member, the write gap film, the thin film coil and the coil support-insulating film and before forming the second magnetic member, patterning the antireflection film by a photolithography process so that the patterned antireflection film can remain only on the inclined portion, applying a photoresist so as to cover the antireflection film and the coil support-insulating film, forming a resistframe having a given enclosed pattern through a photo-lithography process for the photoresist to form the second magnetic member, and forming the second magnetic member in the enclosed pattern of the resistframe so as to cover the antireflection film.

This invention further relates to a method for manufacturing a thin film magnetic head including a slider composed of a substrate and a thin film magnetic head element supported by the substrate, the thin film magnetic head element having a first magnetic member including a first pole portion and a first yoke portion, a second magnetic member including a second pole portion opposing to the first pole portion via a write gap film and constituting, with the first pole portion, an air bearing surface to oppose to a magnetic recording medium and a second yoke portion magnetically connected to the first yoke portion in the remote position from the air bearing surface, a thin film coil of which part is surrounded by the first and second magnetic members, a coil support-insulating film to support the thin film coil, a throat height zero point-defining insulating film rising from the write gap film so as to define the throat height zero point, and an antireflection film between the throat height zero point-defining insulating film and the second pole portion of the second magnetic member, comprising the steps of:

forming the throat height zero point-defining insulating film on the write gap film so that its edge in the side of the air bearing surface can define the throat height zero point after forming the first magnetic member and the write gap film and before forming the thin film coil, the coil support-insulating film and the second magnetic member, forming the antireflection film so as to cover the throat height zero point-defining insulating film, patterning the antireflection film by a photolithography process so that the patterned antireflection film can remain only on the inclined portion of the throat height zero point-defining insulating film in the side of the air bearing surface, applying a photoresist so as to cover the antireflection film, forming a resistframe having a given enclosed pattern through a photolithography for the photoresisit to form the second pole portion, forming the thin film coil so as to be supported by the coil support-insulating film, and forming the magnetic film constituting the second yoke portion of the second magnetic member on the coil support-insulating film so as to be connected to the second pole portion.

In the manufacturing method of a thin film magnetic head, the magnetic film constituting the second yoke portion is preferably formed so that its edge in the side of the air bearing surface may be receded from the air bearing surface.

Although in a normal thin film magnetic head, the antireflection film is removed from the complete thin film magnetic head so as not to remain therein, in the thin film magnetic head of the present invention, the antireflection film is not removed and remains therein. The remaining antireflection film give various advantages as follows:

First of all, since the antireflection film is provided on the rising inclined portion of the thin film coil support-insulating film or the throat height zero-defining insulating film, the exposing light is almost never reflected at the inclined portion in forming the resistframe by the photolithography for forming the second pole portion of the second magnetic member. Accordingly, the exposed pattern of the photoresist to define the shape of the second pole portion of the second magnetic member is almost determined by the exposing pattern of the photomask, particularly, so that the pattern of the resistframe corresponding to the second pole portion can be formed high precisely. That is, according to the present invention, the second pole portion can be formed in a high precise pattern. Moreover, since the pattern of the resistframe corresponding to the second pole portion is prepared high precisely, the thin film magnetic head having a narrowed recording track width can be manufactured.

Furthermore, different from the conventional manufacturing method, it is not required to remove the antireflection film, which does not result in the degradation of the pattern precision of the resistframe due to the difference in etching rate between the second yoke portion and the second pole portion and the decrease of the resistframe height, etc. Therefore, the second pole portion and the second yoke portion can be formed in a high precise pattern.

Moreover, since the antireflection film is covered with the second magnetic member, the remaining antireflection film does not influence the thin film magnetic head as a final product.

BRIEF DESCRIPTION OF THE DRAWINGS

For a better understanding of this invention, reference is made to the attached drawings, wherein.

DETAILED DESCRIPTION OF PREFERRED EMBODIMENTS

<Thin Film Magnetic Head in a First Embodiment>

Figure 1:
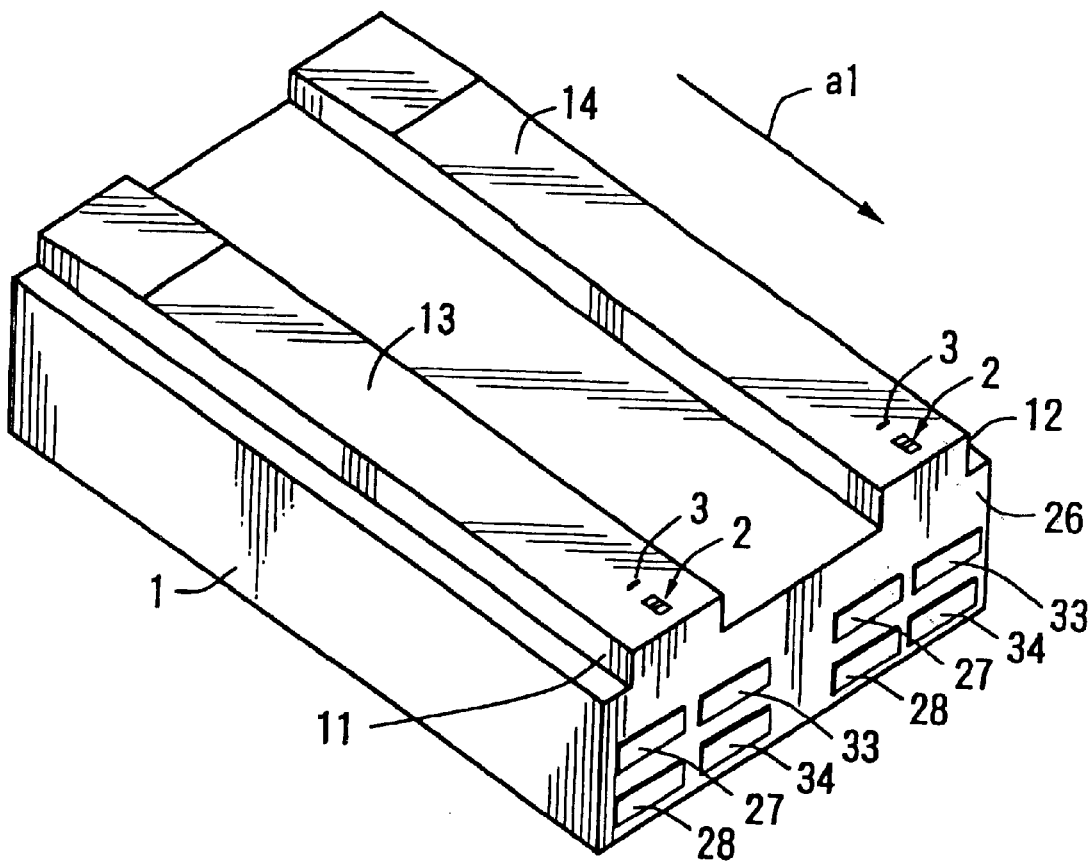
FIGS. 1 and 2 are a perspective view and a cross sectional view showing an embodiment of the thin film magnetic head of the present invention, respectively.
Figure 2:
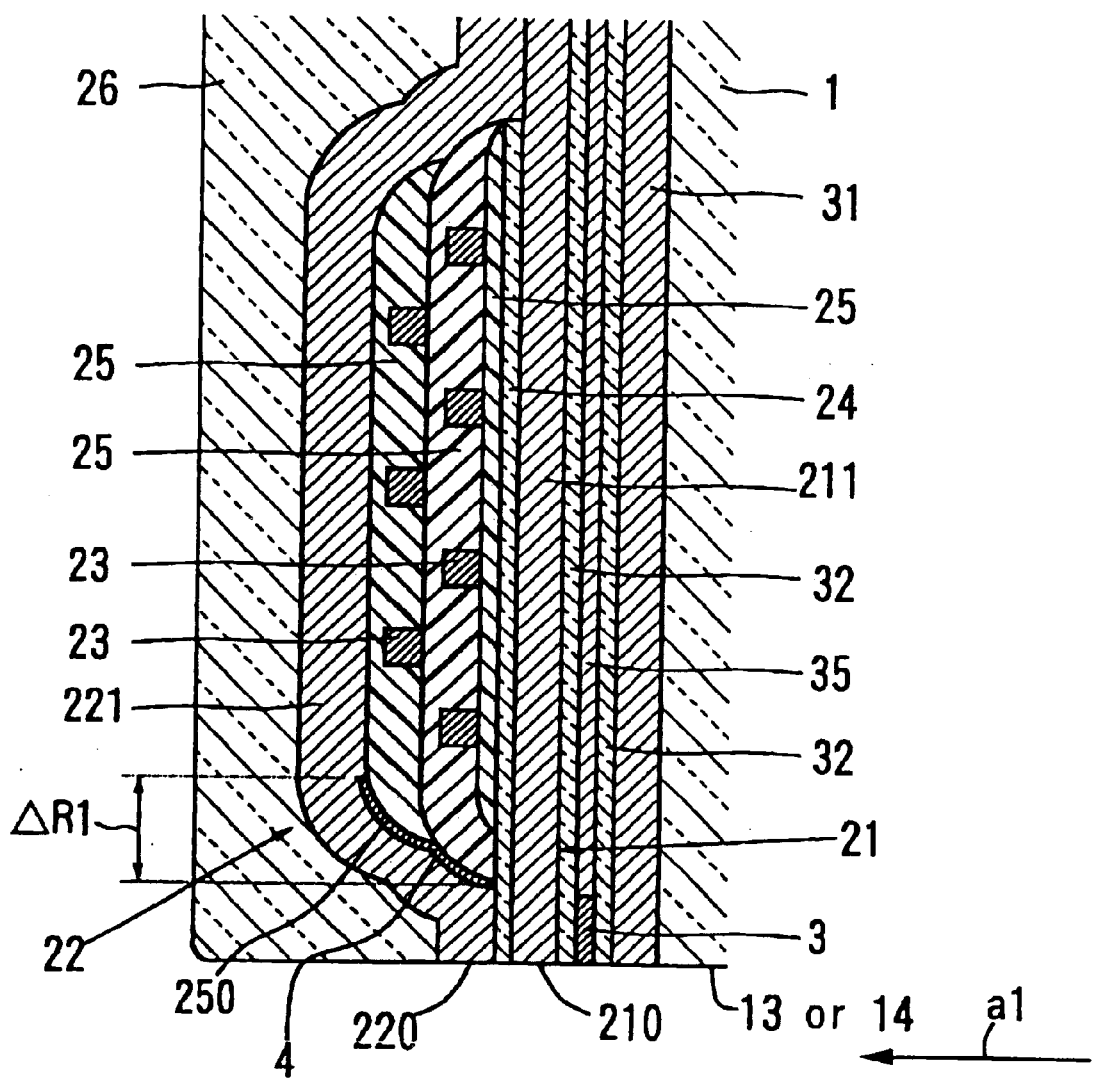

FIG. 1 is a perspective view showing a first embodiment of the thin film magnetic head of the present invention, and FIG. 2 is a cross sectional view of the thin film magnetic head shown in FIG. 1. In the figures, the size of each part is exaggerated. The illustrated thin film magnetic head comprises a slider 1 composed of a substrate and at least one inductive type thin film magnetic conversion element 2 formed on the substrate.

The slider 1 has rail parts 11 and 12 on its opposing surface to a magnetic recording medium, and the surfaces of the rail parts 11 and 12 are employed as air bearing surfaces (ABSs) 13 and 14. The slider 1 does not always have the two rail parts 11 and 12, and may have one to three rail parts. Moreover, the slider may have a flat surface having no rail part. For improving its floating characteristic, the slider may have an opposing surface with various geometrical shape to a recording medium. The method of the present invention can be applied for the sliders having the above various types of surface. The slider 1 is made of a ceramic material such as AlTiC.

The thin film magnetic conversion element 2, which is provided so as to be supported by the substrate constituting the slider, includes a first magnetic film 21, a write gap film 24, a second magnetic film 22, a thin film coil 23, an insulating film 25 to support the thin film coil and to define the throat height zero, and a protection layer 26. The first magnetic film 21 has a first pole portion 210 and a first yoke portion 211. The first pole portion 210 is composed of the end portion thereof in the side of the ABSs 13, 14. The first yoke portion 211 continues to the first pole portion 210 and is elongated backward from the first pole portion 210 as is viewed from the ABSs 13, 14. The thin film coil 23 is supported by the insulating film 25. The write gap film 24 is provided at least on the first pole portion 210.

The insulating film 25, provided above the first yoke portion 211, supports the thin film coil 23 and has rising-inclined portion 250 on the write gap film 24 in the side of the ABSs 13, 14. Generally, the inclined portion 250 has an arc-shape like surface, depending on the number of the insulating film 25. The edge of the inclined portion 250 in the side of the ABSs 13, 14 defines the throat height zero.

The second magnetic film 22 comprises a second pole portion 220 and a second yoke portion 221. The second pole portion 220 is opposed to the first pole portion 210 via the write gap film 24. The second yoke portion 221 is provided on the insulating film 25, continuing to the second pole portion 220, and is connected to the first yoke portion 211 backward.

The first magnetic film 21, the write gap film 24, the second magnetic film 22, the thin film coil 23, the coil insulating film 25 and the protection film 26 are made of materials well known by the ordinary person skilled in the art and have thicknesses and patterns known by them as well. Moreover, they may be produced by normal means. The favorably concrete examples are exemplified as follows:

First of all, the first magnetic film 21 is formed, of a soft magnetic material such as NiFe, CoFe, CoFeNi, in a thickness of 0.5–4 $\mu$m. As the forming method, a plating method and a sputtering method etc. may be used.

The second magnetic film 22 is formed, of a soft magnetic material such as NiFe, CoFe, CoFeNi, in a thickness of 3–5 $\mu$m. As the forming method, a frame plating method can be used. The details will be described hereinafter.

The thin film coil 23 is formed of a conductive material such as Cu. The thickness of the thin film coil 23 is preferably 2–5 $\mu$m. The thin film coil 23 may be formed by a frame plating method, etc.

The write gap film 24 may be made of a non-magnetic insulating material such as $Al_2O_3$, $SiO_2$ or a non-magnetic metallic material. In making the film of the non-magnetic insulating material such as $Al_2O_3$, $SiO_2$, a sputtering method etc. may be used. In making the film of the non-magnetic metallic material, a plating method or a sputtering method can be used. The thickness of the write gap film is preferably 0.01–0.5 $\mu$m.

The insulating film 25 is preferably formed through the hardening of a photoresist material. The layer number and the thickness of the insulating film 25 is varied, depending on the layer number of the thin film coil 23 and the coil-supporting structure. Generally, the insulating film 25 has a thickness of about 3–20 $\mu$m.

The protection film 26 may be made of an insulating material such as $Al_2O_3$, $SiO_2$. Its thickness is preferably about 5–50 $\mu$m. The protection film 26 can be formed by a sputtering method, etc.

The thin film coil 23 constitutes a thin film magnetic circuit with the first magnetic film 21, the second magnetic film 22 and the write gap film 24. The thin film coil 23 is supported by the insulating film 25 and is formed so as to turn spirally around a connecting portion of a yoke portion. Both ends of the thin film coil 23 is conductively connected to taking out-electrodes 27 and 28 (see, FIG. 1). The winding number and the layer number of the thin film coil 23 are not limited. In this example, the thin film coil 23 has two layered structure.

In the illustrated thin film magnetic head, since the slider 1 has ABSs 13 and 14 on its opposing surface to a medium and the thin film magnetic conversion element is provided on the slider 1, the thin film magnetic head can be employed as a floating thin film magnetic head which is used with a magnetic recording medium such as a magnetic disk.

Since the yoke portion 221 of the second magnetic film 22 is magnetically connected to the first magnetic film 21 in its rear side, the magnetic field generated by flowing a writing current in the thin film coil 23 can be effectively conducted to the first pole portion 210 and the second pole portion 220 via the yoke portion 221.

The thin film magnetic head shown in FIGS. 1 and 2 is a combination type thin film magnetic head having the inductive type magnetic conversion element 2 for writing and the MR (magnetoresistive effective) element 3 for reading. The thin film magnetic conversion elements 2 and 3 are provided on one end or both ends of the railing parts 11 and 12 as are viewed from a moving directional of a recording medium. The recording medium moving directional corresponds to an outflow direction of an air when the recording medium moves at a high speed. On the end of the slider 1 in the recording medium moving direction al are provided the taking out-electrodes 27 and 28 connected to the thin film magnetic conversion element 2 and taking out-electrodes 33 and 34 connected to the thin film magnetic conversion element 3.

As the MR element, various film structures have been proposed and practically used. For example, a MR element using an anisotropic magneto-resistive (IMR) effective element, a giant magnetoresistive (GMR) effective film or a tunnel connection magnetoresistive (TMR) effective film is exemplified. In this invention, any kind of the above film structures may be employed. The MR element 3 is placed, between a first shield film 31 and the first magnetic film 21 doubling as a second shield film, in an insulating film 32. The insulating film 32 is made of alumina, etc. The MR element 3 is connected to the taking out-electrodes 33 and 34 (see, FIG. 1) via a leading conductor 35 (see, FIG. 2).

The thin film magnetic head in a first embodiment is characterized in that in the above normal structure, the antireflection film 4 is not removed and remains. That is, the antireflection film 4 is provided on the rising-inclined portion 250 of the insulating film 25 and is covered with the second magnetic film 22.

As mentioned above, since the antireflection film 4 is not removed and remains on the rising-inclined portion 250 of the insulating film 25, various advantages are obtained in manufacturing the above thin film magnetic head. First of all, in the forming process of the resistframe for the second magnetic film 22 by photolithography, the exposing light is almost never reflected at the inclined portion 250 of the insulating film 25. Consequently, the exposed pattern of the photoresist to define the second pole portion 220 is determined by the exposing pattern of the photomask, resulting in the high precise formation of the resistframe corresponding to the second pole portion 220. As a result, the second pole portion 220 having a high precise pattern can be obtained. Moreover, since the pattern of the resistframe corresponding to the second pole portion can be formed high precisely, the thin film magnetic head can be manufactured so as to have a narrowed recording track width of not more than 1.0 μm, for example.

Furthermore, since the antireflection film 4 is not required to be removed, the degradation of the pattern precision of the resistframe due to the difference in etching rate between the second yoke portion 221 and the second pole portion 220 and the deterioration of the resistframe height, etc. are hindered. Therefore, the second pole portion 220 and the second yoke portion 221 can be formed in high precise pattern.

Moreover, since the antireflection film 4 is covered with the second magnetic film 22, the thin film magnetic head as a final product is not influenced from the remaining antireflection film. For covering the antireflection film 4 with the second magnetic film 22, the antireflection 4 is formed so that at least one of the length $\Delta R1$ in the backward direction from the ABSs 13, 14 and the width in the antireflection film 4 can be not more than the twice plated thickness of the second magnetic film 22. Thereby, generally, the second magnetic film 22 which is normally formed as a frame-plated film is grown to the interior of the antireflection film 4 from both ends thereof in the long direction or the width direction, and becomes continuative before it reaches a given plate-thickness.

<Manufacturing Method of the Thin Film Magnetic Head in the First Embodiment>

Next, the manufacturing method of the thin film magnetic head in the first embodiment shown in FIGS. 1 and 2 will be described. FIGS. 3–29 show the successive manufacturing steps included in the manufacturing method of the thin film magnetic head in the first embodiment. In the above figures, the same references are given to the similar parts to the ones in FIGS. 1 and 2. Although in a real manufacturing process, many thin film magnetic head are formed on a wafer, in those figures, only one element on the wafer is shown.

Figure 3:
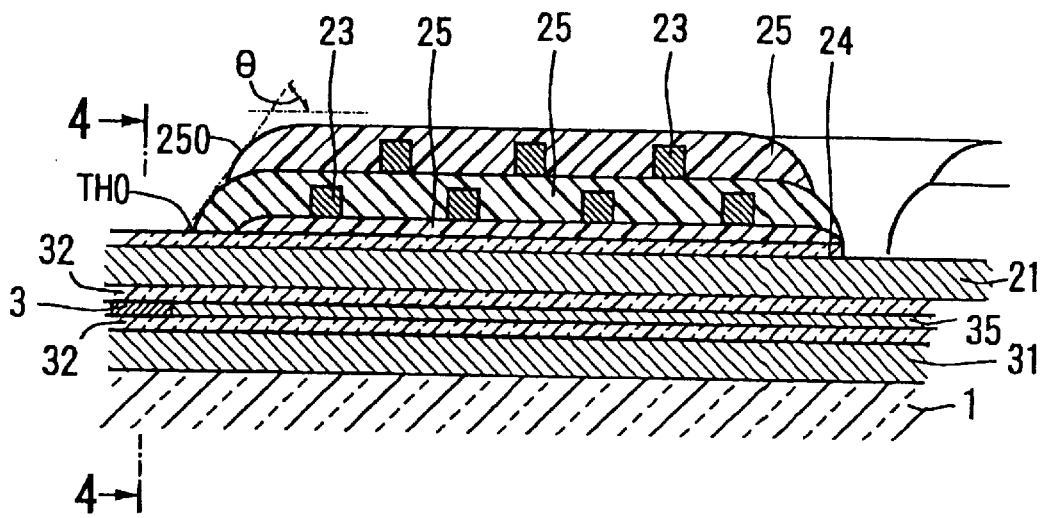
FIGS. 3, 4, and 5 are cross sectional views and a plan view showing the assembly in the middle of the manufacturing process of the thin film magnetic head shown in FIGS. 1 and 2, FIGS. 6, 7, and 8 are cross sectional views and a plan view showing the assembly in the next step to the step of FIGS. 3, 4 and 5, FIGS. 9, 10, and 11 are cross sectional views and a plan view showing the assembly in the next step to the step of FIGS. 6, 7 and 8, FIGS. 12, 13, and 14 are cross sectional views and a plan view showing the assembly in the next step to the step of FIGS. 9, 10 and 11, FIGS. 15, 16, and 17 are cross sectional views and a plan view showing the assembly in the next step to the step of FIGS. 12, 13 and 14, FIGS. 18, 19, and 20 are cross sectional views and a plan view showing the assembly in the next step to the step of FIGS. 15, 16 and 17, FIGS. 21, 22, and 23 are cross sectional views and a plan view showing the assembly in the next step to the step of FIGS. 18, 19 and 20, FIGS. 24, 25, and 26 are cross sectional views and a plan view showing the assembly in the next step to the step of FIGS. 21, 22 and 23, FIGS. 27, 28 and 29 are cross sectional views and a plan view showing the assembly in the next step to the step of FIGS. 24, 25 and 26.
Figure 4:
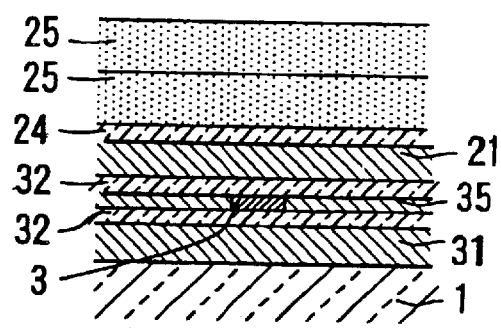
Figure 5:
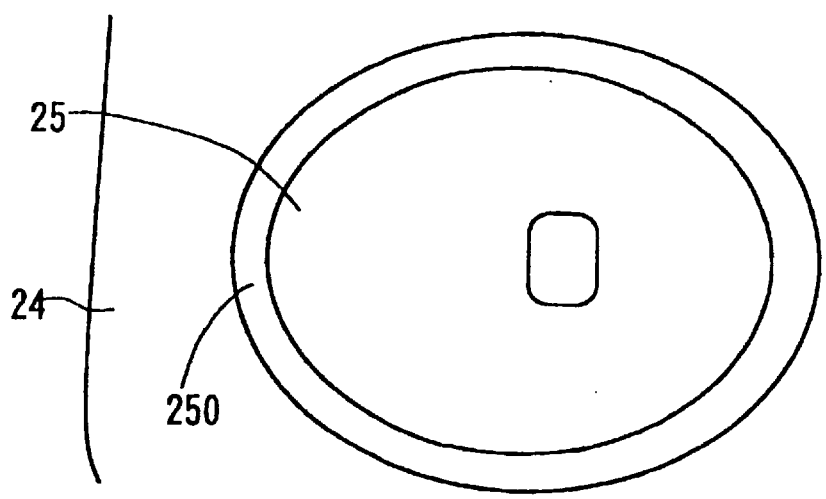

First of all, the manufacturing method will be explained, with reference to FIGS. 3–5. FIG. 3 is an elevational section view of the magnetic conversion element in the thin film magnetic head assembly in a manufacturing step, and FIG. 4 is a cross sectional view taken on line "4—4" of FIG. 3. Then, FIG. 5 is a plan view of the magnetic conversion element shown in FIGS. 3 and 4. For convenience, the sizes of the parts of the thin film magnetic head assemblies shown in FIGS. 3–5 does not always correspond one another. Moreover, the sizes are exaggerated. As is shown in the figures, on the substrate 1 as the slider are formed the first magnetic film 21, the write gap film 24, the insulating film 25 to support the thin film coil 23. On the whole surface of the assembly including the insulating film 25 is formed a plate-underfilm (seed film) to form the second magnetic film by plating. The MR element 3, the first shield film 31, the insulating film 32 and the leading conductor 35, etc. are formed. These constituting parts may be formed by a well known process to the ordinary person skilled in the art.

The insulating film 25 has the inclined portion 250 rising at an inclined angle θ toward its thickness direction on the write gap film 24. The rising start point of the inclined portion 250 corresponds to the throat height zero point, and the rising angle θ corresponds to the apex angle. The angle θ is preferably 10–60 degrees, more preferably 30–45 degrees.

Figure 6:
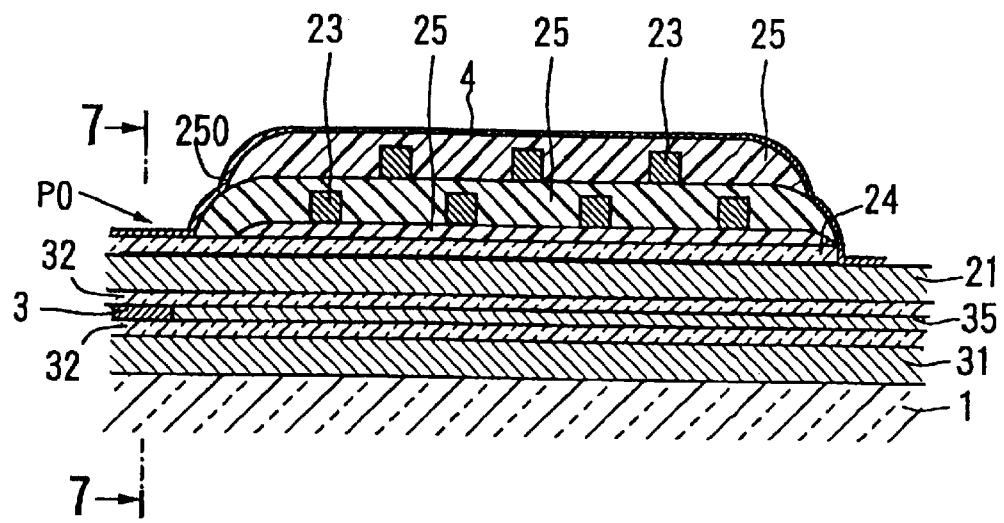
Figure 7:
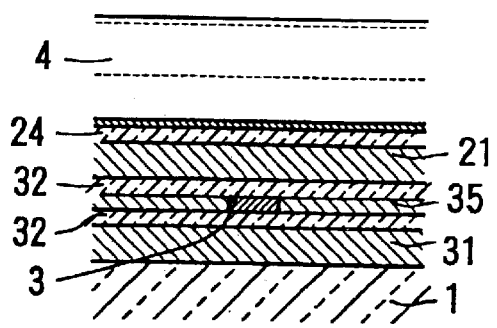
Figure 8:
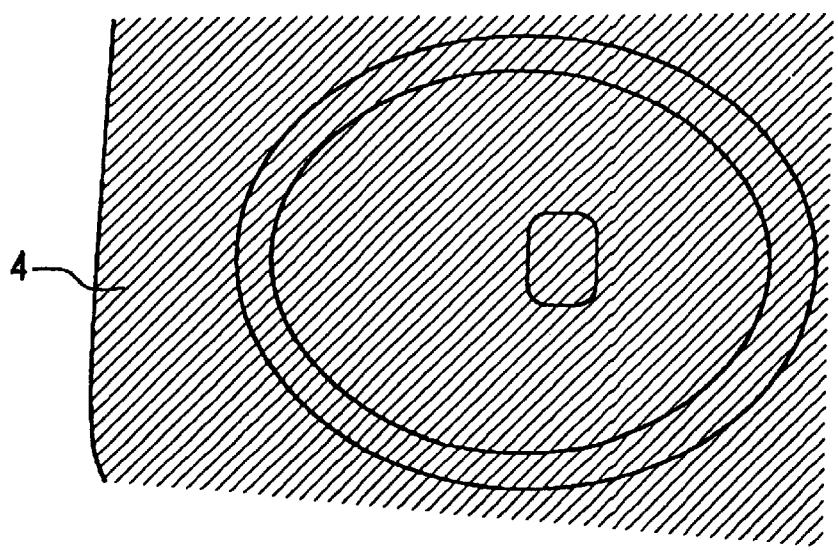

Subsequently, as shown in FIGS. 6–8, the antireflection film 4 is formed. The antireflection film 4 is formed at least on the surface including the inclined portion 250 of the insulating film 25. In the figures, the antireflection film 4 is formed so as to cover the whole surface of the insulating film 25.

The antireflection film 4 may be preferably made of, besides conventional materials suggested in the past, a derivative of a polysulfone polymer:

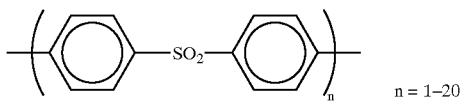

n = 1–20 or a derivative of a maleimidevinyl copolymer:

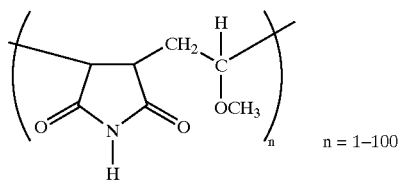

n = 1–100

The antireflection film may be made by a spin coating method, etc. In addition, the antireflection film may be made of an inorganic material such as TiN or DLC (Diamond like Carbon). The antireflection film made of the inorganic material may be formed by a film-forming method such as sputtering and CVD.

Figure 9:
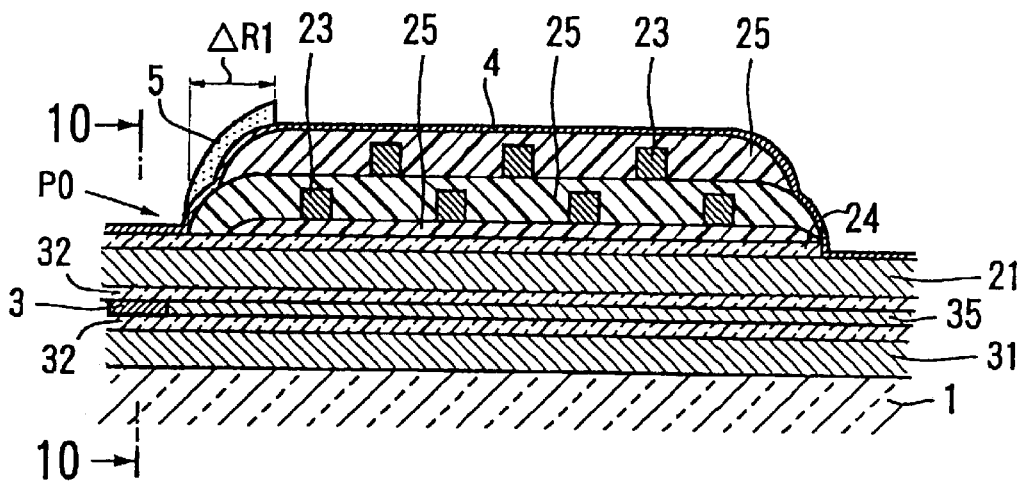
Figure 10:
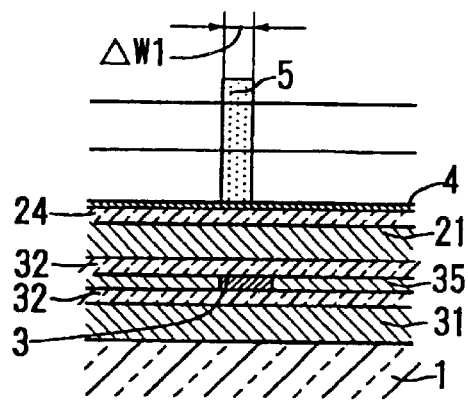
Figure 11:
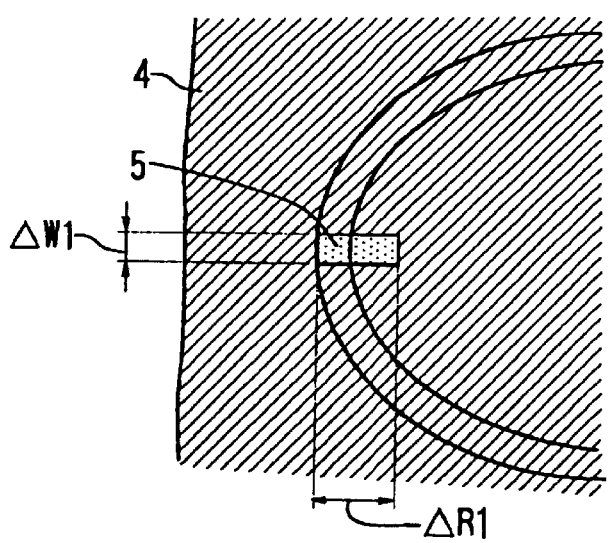

Next, the antireflection film 4 is patterned so as to remain on the inclined part 250. In patterning the antireflection film 4, a photoresist is applied on the whole surface of the antireflection film 4. Subsequently, the photoresist is patterned so that the patterned photoresist to be a mask for the antireflection film 4 can remain only on the inclined portion 250. FIGS. 9–11 show a mask pattern 5 of the photoresist patterned by the above step. The mask pattern 5 covers the inclined part 250 ranging to a pole portion area P0 of the insulating film 25, not the pole portion area P0 itself. The mask pattern 5 is formed so that at least one of the length ΔR1 in the backward direction from the throat height zero point TH0 and the width ΔW1 thereof can be not more than the twice plate thickness of the second magnetic film 22. Moreover, it is not required that the edge of the antireflection film 4 in the side of the ABSs 13, 14 coincide with the throat height zero point TH0.

Figure 12:
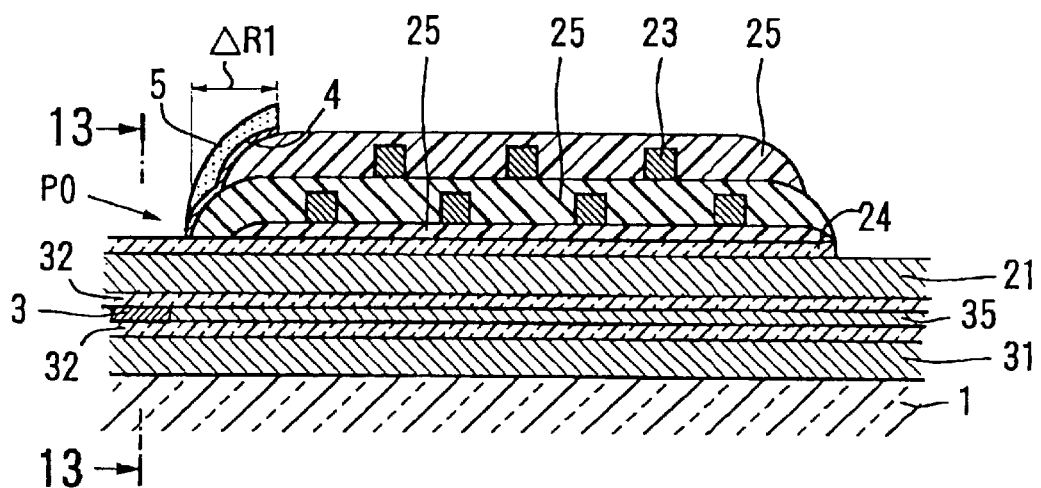
Figure 13:
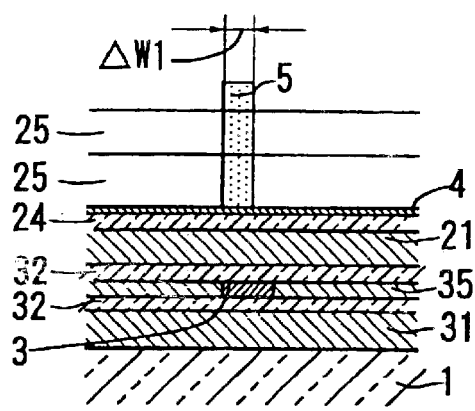
Figure 14:
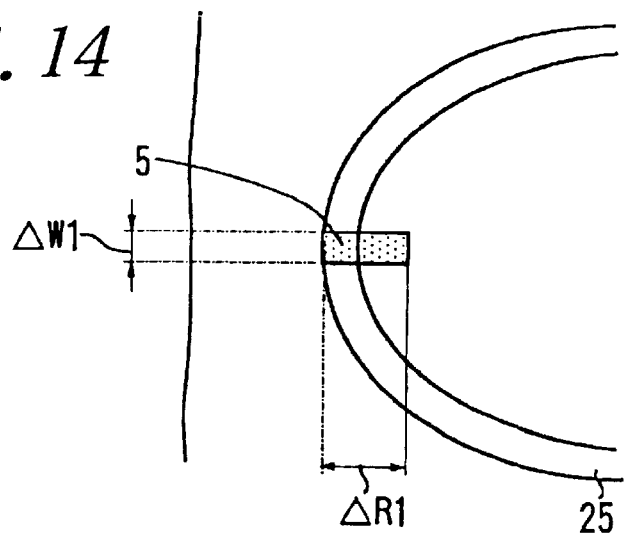
Figure 15:
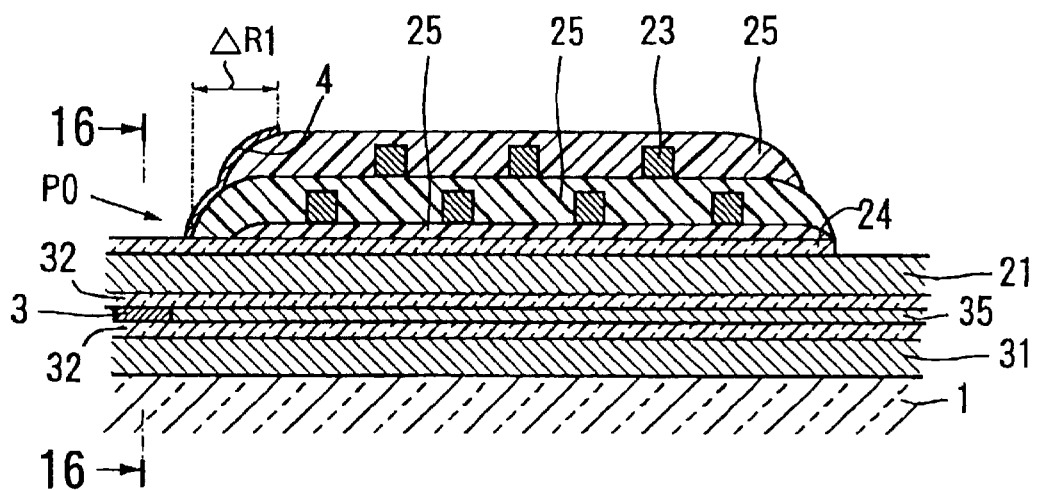
Figure 16:
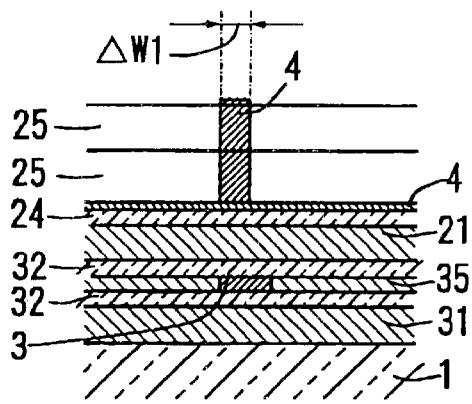
Figure 17:
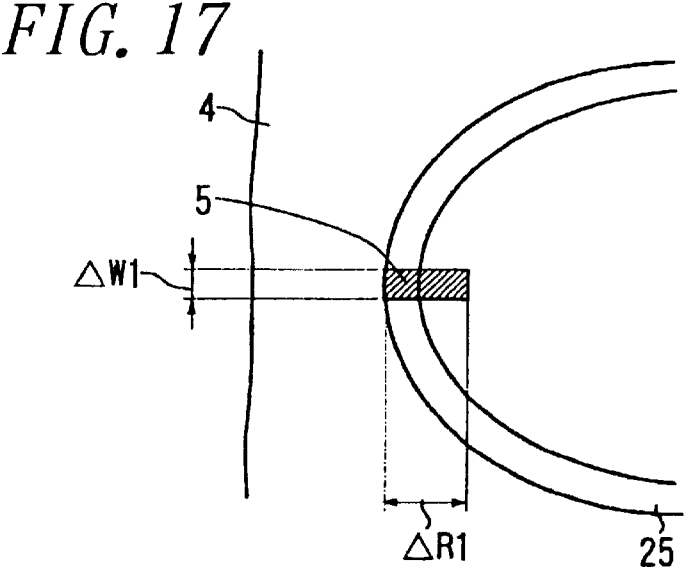

Thereafter, as shown FIGS. 12–14, the part of the antireflection film 4 uncovered with the mask pattern is removed. The antireflection 4 made of the derivative of the polysulfone polymer or the maleomidevinyl copolymer can be easily removed by dry-etching such as ashing. Moreover, the antireflection film 4 made of the inorganic material such as TiN or DLC can be removed by dry-etching such as milling or RIE (Reactive Ion Etching). Thereby, as shown in FIGS. 15–17, the antireflection film 4 remains only on the inclined portion 250. Since the shape of the mask pattern 5 is transcribed, the antireflection film 4 is formed so that at least one of the length ΔR1 in the backward direction from the throat height zero point or the nearby area thereof and the width ΔW1 in the antireflection film can be not more than the twice plate thickness of the second magnetic film 22.

Figure 18:
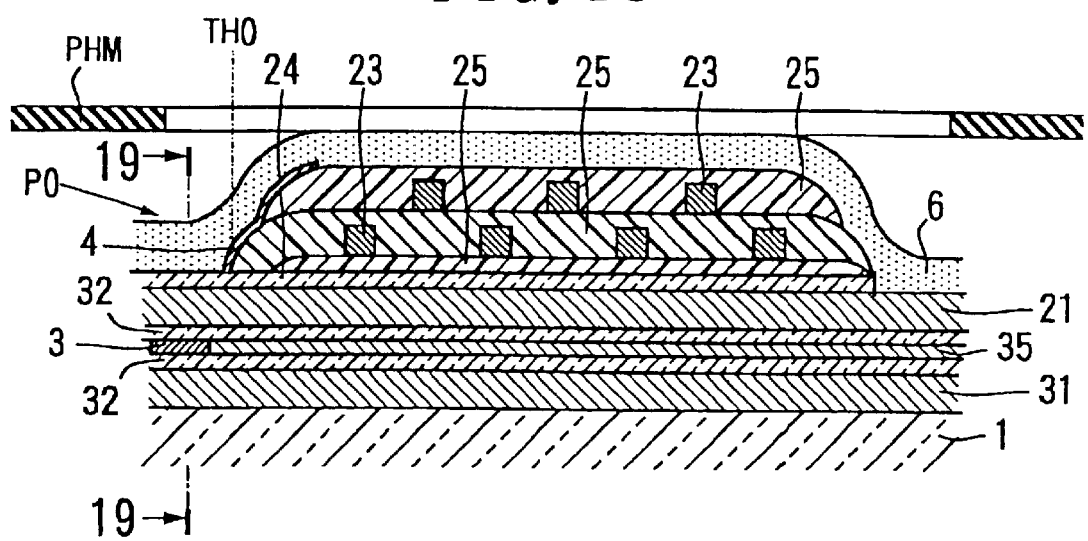
Figure 19:
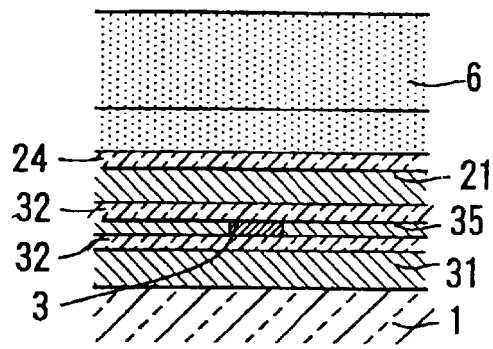
Figure 20:
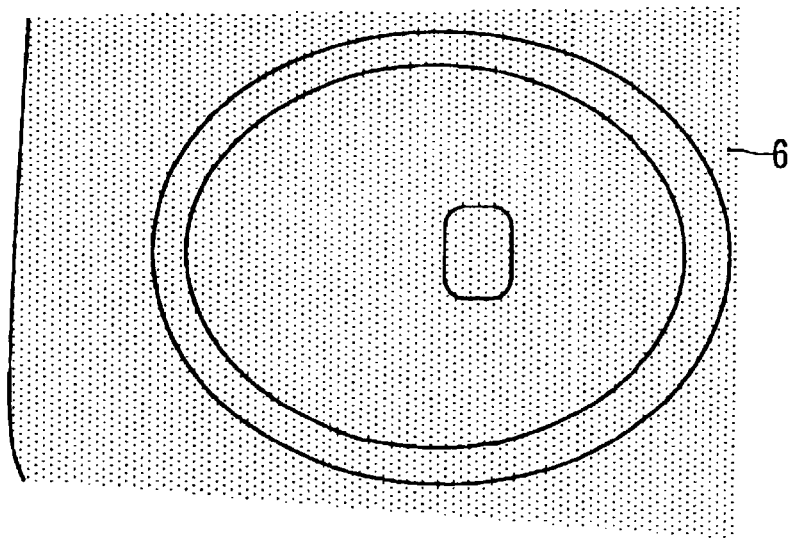
Figure 21:
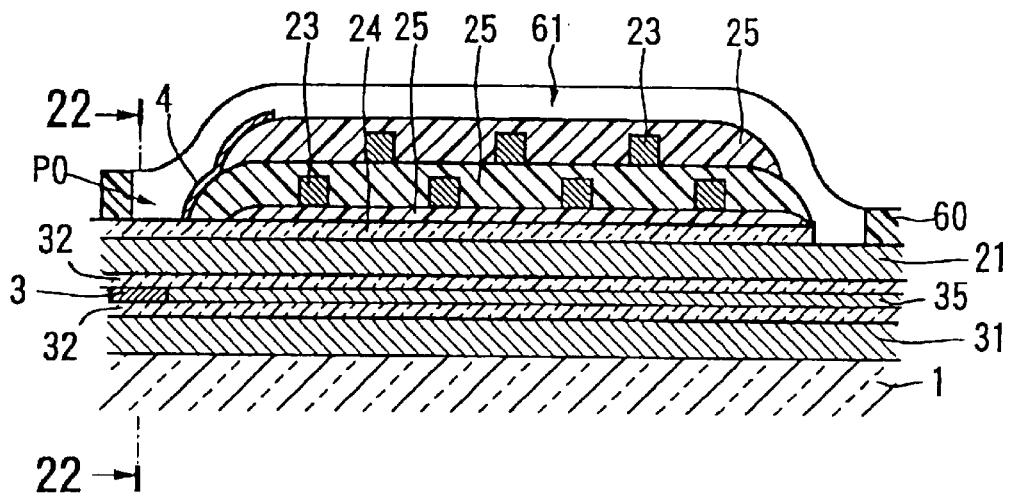
Figure 22:
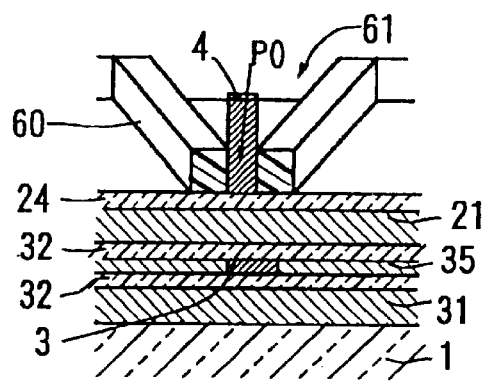
Figure 23:
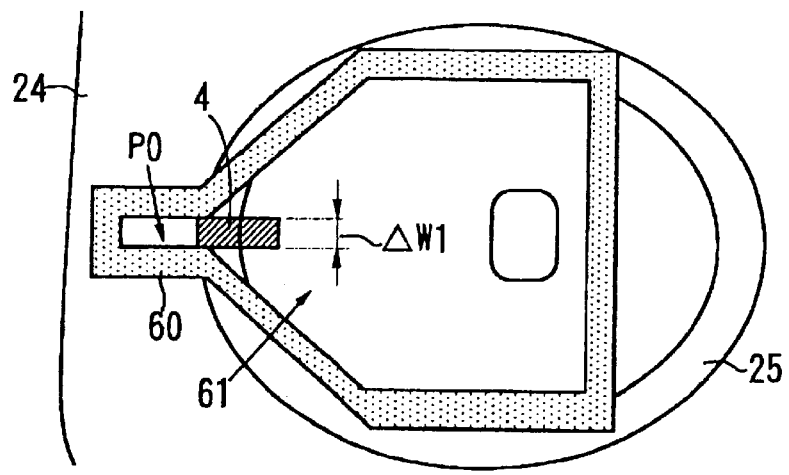

Subsequently, after the mask pattern is removed, as shown in FIGS. 18–20, a photoresist 6 is applied so as to cover the antireflection film 4 and the insulating film 25. The photoresist 6 may be applied by a spin coating method. A photomask PHM is set on the photoresist 6 and a photolithography to form the second magnetic film is carried out. Thereby, as shown in FIGS. 21–23, a resist frame 60 is formed. The remaining antireflection film 4 on the inclined portion 250 ranging to the pole portion area almost never reflects the exposing light at the plate-underfilm formed on the inclined portion 250 of the insulating film 25 in the photolithography process for the photoresist 6 to form the second magnetic film. Consequently, the exposed pattern of the pole portion area P0 is almost defined by the exposing pattern of the photomask PHM, particularly, and the pattern of the pole portion area in the interior pattern 61 enclosed by the resistframe 60 can be formed in the high precise shape determined by the precision of the photolithography process. The antireflection film 4 made of the derivative of the polysulfone polymer or maleimidevinyl copolymer, TiN, or DLC has a small reflectance, and can form the pattern of the resistframe 60 corresponding to the pole portion area P0 higher precisely.

Figure 43:
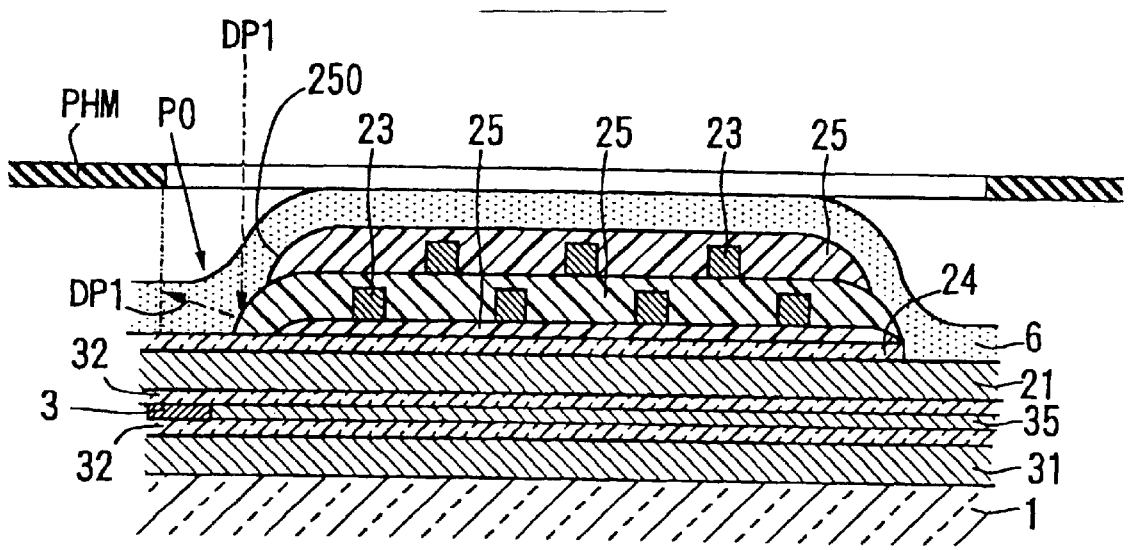
FIG. 43 is a cross sectional view for explaining the problem in the conventional manufacturing method of a thin film magnetic head.

FIG. 43 shows a conventional assembly of a thin film magnetic head not having the antireflection film. Without the antireflection film, an exposing light DP1 is reflected at the plate-underfilm already formed. The part of the reflected exposing light reaches the pole portion area. Accordingly, the exposed pattern of the pole portion is different from that of the exposing pattern of the photomask PHM, resulting in the deterioration of the resistframe 60 corresponding to the pole portion.

Figure 24:
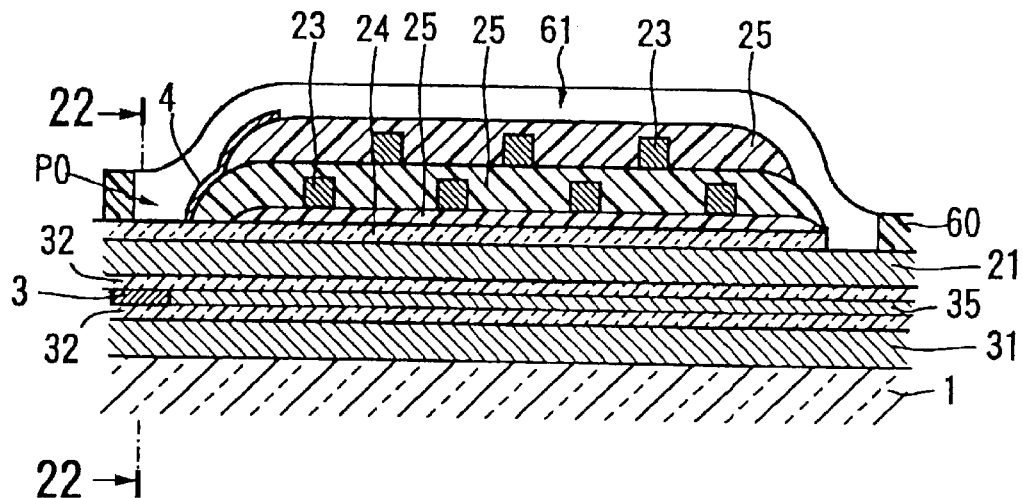
Figure 25:
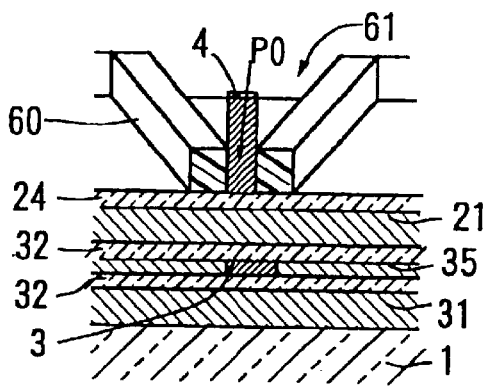
Figure 26:
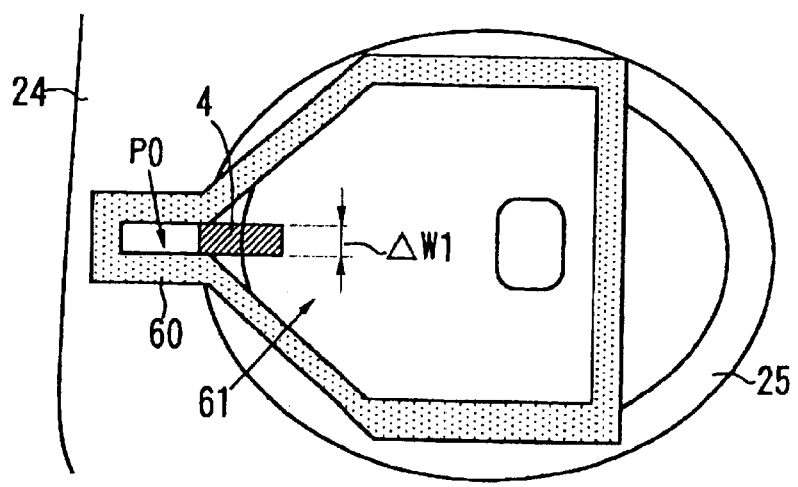

Next, as shown in FIGS. 24–26, the second magnetic film 22 is formed in the pattern enclosed by the resistframe 60. The antireflection film 4 is covered with the second magnetic film 22. The second magnetic film 22 constitutes the second pole portion 220 parallel to the write gap film 24 and the first magnetic film 21 up to the position of throat height zero point TH0 and is inclined at the apex angle θ toward the top surface of the insulating film 25 from the position of throat height zero point TH0.

Since the pattern (pole portion area) of the resistframe 60 to define the second pole portion 220 has a high precise size and shape almost determined by the exposing pattern of the photomask, the second pole portion 220 can be formed in a high precise pattern. Moreover, the pattern 61 of the resistframe 60 corresponding to the second pole portion 220 can be formed high precisely, the thin film magnetic head having a narrowed recording track width of not more than 1.0 μm, for example, can be manufactured.

Furthermore, since the part of the antireflection film 4 in the pattern 61 enclosed by the resistframe 60 is covered with the second magnetic film 22 (see, FIGS. 24–26), it dose not influence the magnetic characteristics of the second magnetic film 22. In this embodiment, since the antireflection film 4 is formed so that its width ΔW1 (see, FIG. 23) can be not more than the twice plate thickness of the second magnetic film 22, the second magnetic film 22 as a frame-plated film is grown to the interior of the antireflection film 4 from both ends thereof in the width direction, and becomes continuative before the second magnetic film 22 reaches to a given plate thickness.

Figure 27:
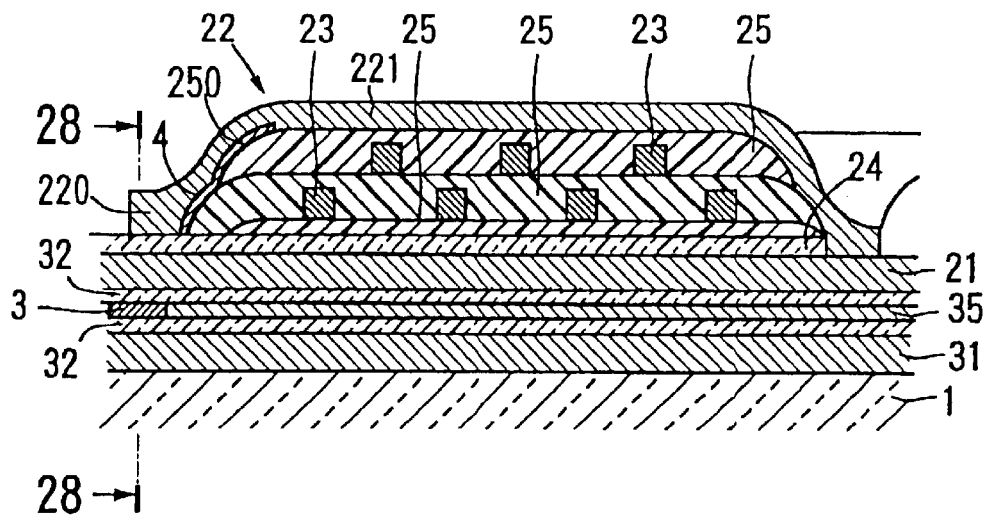
Figure 28:
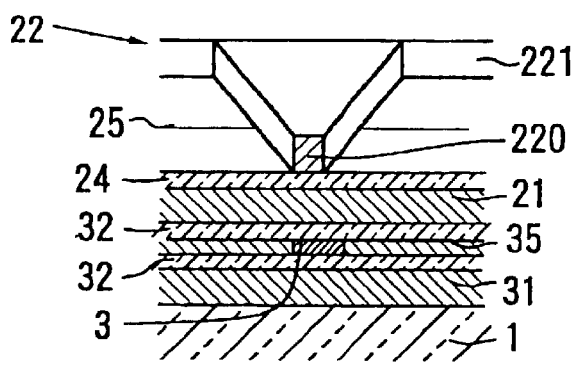
Figure 29:
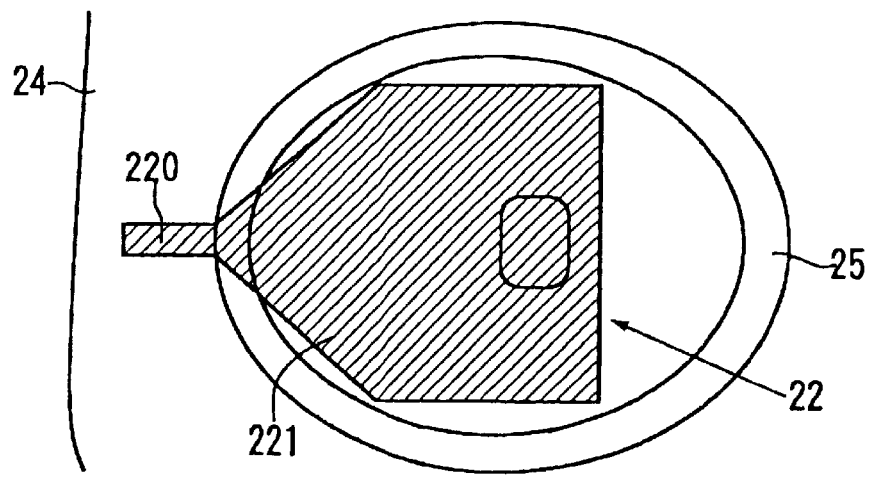

Subsequently, as shown in FIGS. 27–29, the resistframe 60 is removed. The resistframe 60 can be removed by a dissolution method using an organic solvent or a dry-etching method such as ashing.

Moreover, since the antireflection film 4 is not required to be removed, the deterioration of the pattern precision of the resistframe 60 due to the difference in etching rate between the second yoke portion 221 and the second pole portion 220 and the decrease of the height of the resistframe 60 are inhibited. Therefore, the pole portion 220 and second yoke portion 221 of the second magnetic film 22 can be formed in a high precise pattern.

The pole portion, which is composed of the first magnetic film 21, the write gap film 24 and the second magnetic film 22, may have various structures and configurations for attaining the high recording density, etc. This invention can widely cope with the variation of the structure or configuration in the pole portion.

In this embodiment, the manufacturing method of the combination type thin film magnetic head having the writing inductive type magnetic conversion element 2 and the reading MR element 3 is described. Therefore, the manufacturing process includes the step of forming the MR element 3. The MR element 3 is formed before the inductive type magnetic conversion element 2.

Moreover, needless to say, after the steps depicted in FIGS. 3–29, the steps necessary for obtaining the thin film magnetic head shown in FIGS. 1 and 2 are carried out, which is not shown. Conventionally well known steps may be adopted for the necessary steps.

<Thin Film Magnetic Head in a Second Embodiment>

Figure 30:
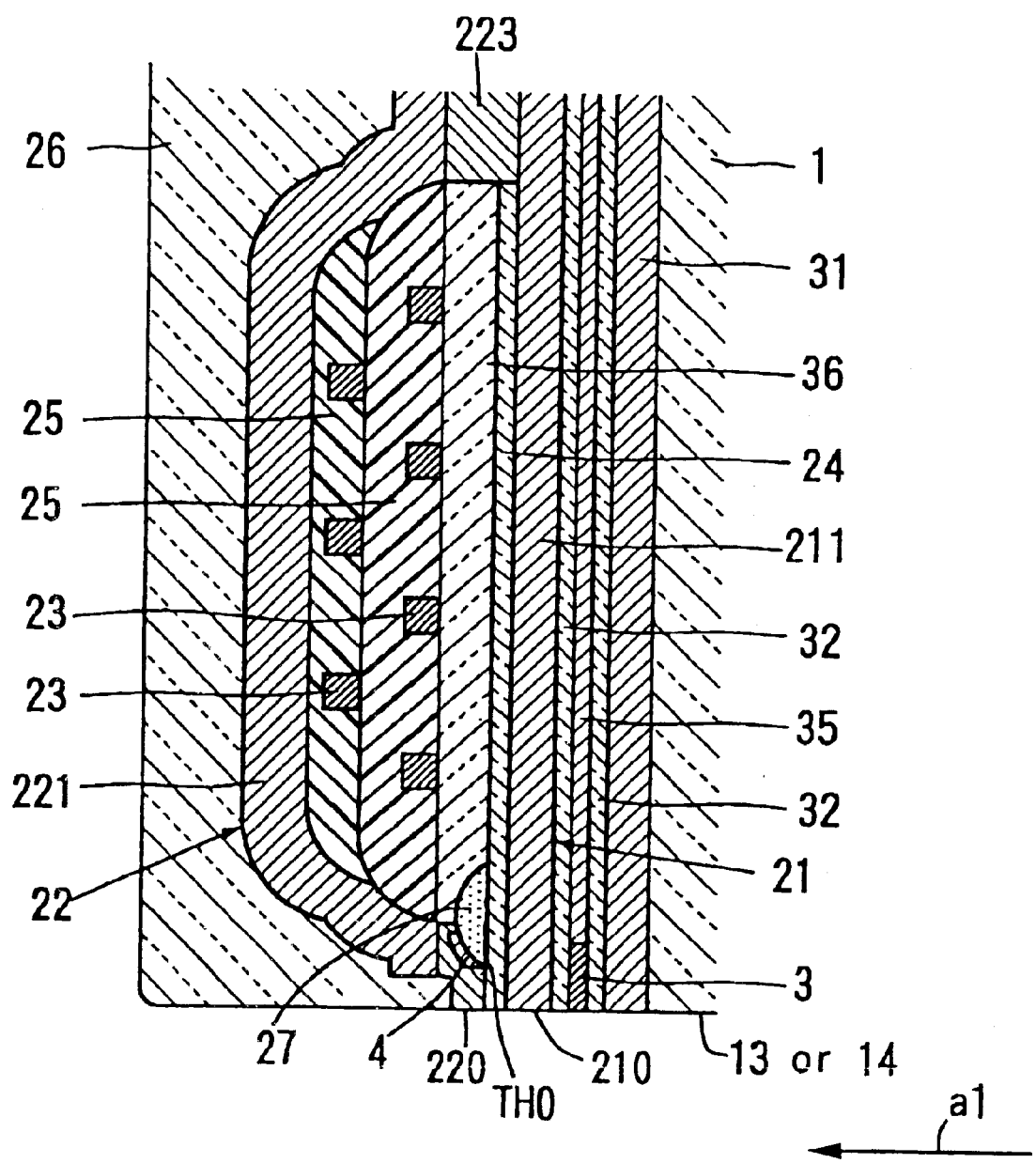
FIG. 30 is cross sectional view showing another embodiment of the thin film magnetic head of the present invention.
Figure 31:
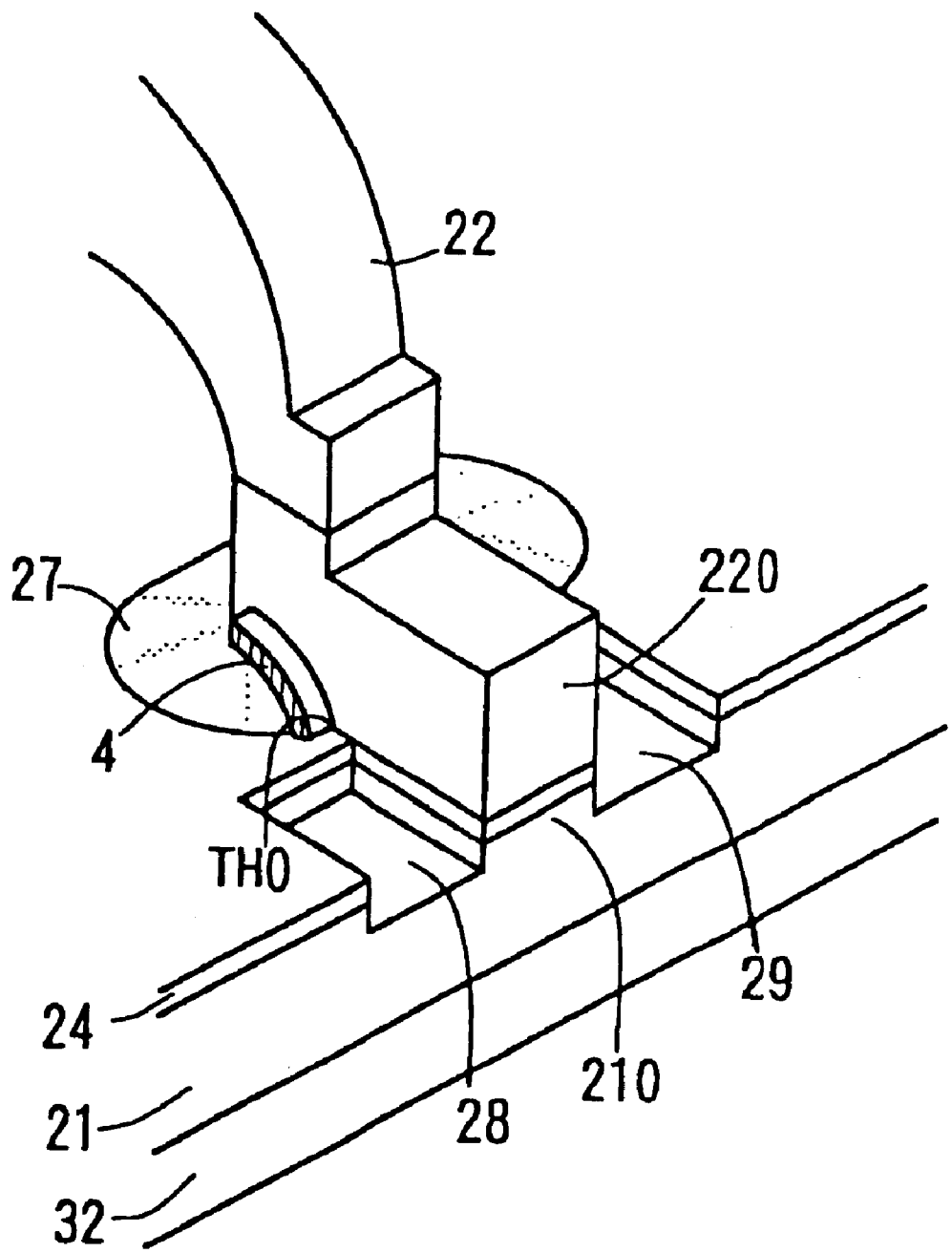
FIG. 31 is an enlarged perspective view showing the pole portion of the thin film magnetic head shown in FIG. 30, FIGS. 32–42 are cross sectional views showing the successive manufacturing steps of the thin film magnetic head shown in FIGS. 30 and 31.

FIG. 30 is a cross sectional view in the second embodiment, and FIG. 31 is an enlarged perspective view of the pole portion of the thin film magnetic head shown in FIG. 30. In the figures, the same references are given to the same constituting parts as the ones in FIGS. 1 and 2. In the thin film magnetic head, the insulating film includes the first insulating film 25 and a second insulating film 27. The first insulating film 25 supports the thin film coil 23. The second insulating film 27 is provided on the base portion of the first insulating film 25 in the side of the ABSs 13, 14, and determines the throat height zero point.

In the second magnetic film 22, the second yoke portion 221 is provided on the first insulating film 25, its one end being connected to the second pole portion 220, its other end being connected to the first yoke portion 211 at a backward connecting portion 223. The antireflection film 4 is provided on the second insulating film 27 in the side of the ABSs 13, 14, and is covered with the second pole portion 220. Depressed portions 28 and 29 are provided at both sides of the first pole portion 210, and narrow the track width.

As mentioned above, since the antireflection film 4 is provided on the second insulating film 27 in the side of the ABSs 13, 14, the exposing light for forming the resistframe is almost never reflected at the inclined portion of the second insulating film 27 in the photolithography process for the second pole portion 220. Therefore, particularly, the exposed pattern of the phootoresist covering the second magnetic pole portion 220 is almost determined by the exposing pattern of the photomask, leading to the precise formation of the pattern of the resistframe corresponding to the second magnetic pole portion 220. Consequently, the second pole portion 220 can be formed in a high precise pattern. Moreover, since the resistframe pattern corresponding to the second pole portion 220 can be prepared precisely, the thin film magnetic head having a narrowed recording track width of not more than 1.0 μm can be manufactured.

Moreover, since the antireflection film 4 is not required to be removed, the deterioration of the pattern precision of the resistframe 60 due to the difference in etching rate between the second yoke portion 221 and the second pole portion 220 and the decrease of the height of the resistframe 60 are inhibited. Therefore, the pole portion 220 and second yoke portion 221 of the second magnetic film 22 can be formed in a high precise pattern.

Since the antireflection film 4 is covered with the second pole portion 220, the remaining antireflection film 4 does not influence the thin film magnetic head as a final product.

<Manufacturing Method of the Thin Film Magnetic Head in the Second Embodiment>

Figure 32:
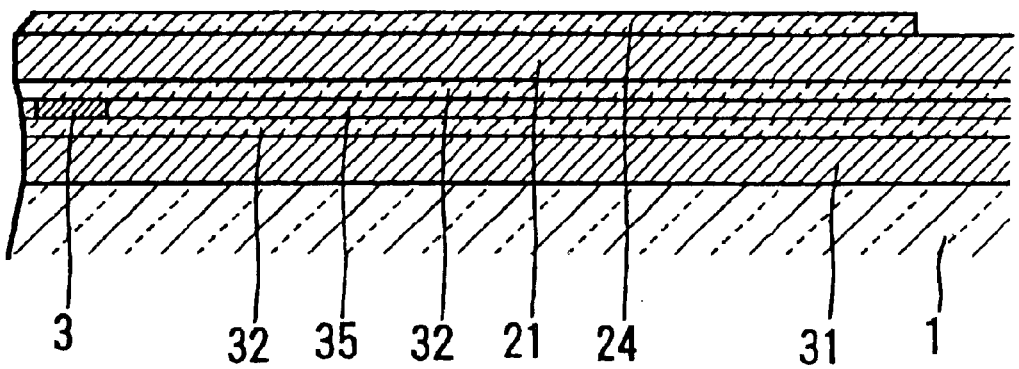
Figure 33:
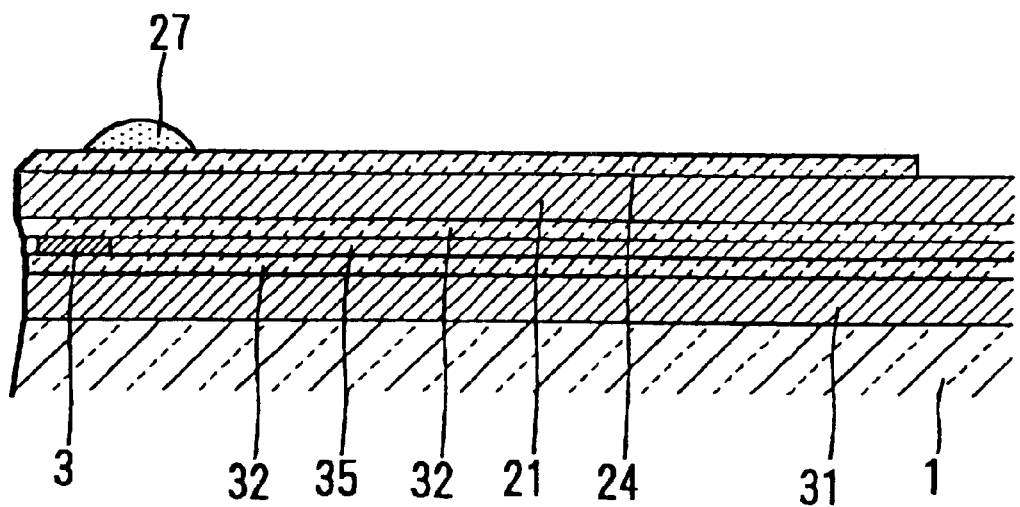

The manufacturing method of the thin film magnetic head in the second embodiment will be described, with reference to FIGS. 32–42. First of all, after the first magnetic film 21 and the write gap film 24 are formed as shown in FIG. 32, the second insulating film 27 is formed in a given shape such as a hemispherical shape on the write gap film 24 as shown in FIG. 33. In the formation of the second insulating film 27, the throat height zero point TH0 is taken into account. At the time of the formation of the second insulating film 27, the first insulating film 25 and the second magnetic film 22 are not formed, yet.

Figure 34:
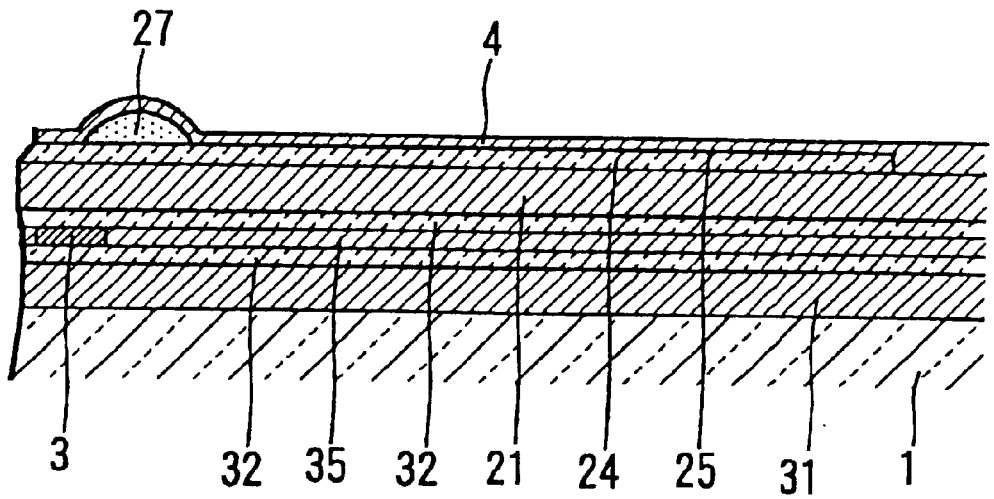

Subsequently, as shown in FIG. 34, the antireflection film 4 is formed so as to cover the second insulating film 27. The antireflection film 4 is formed by the above method and material already described.

Figure 35:
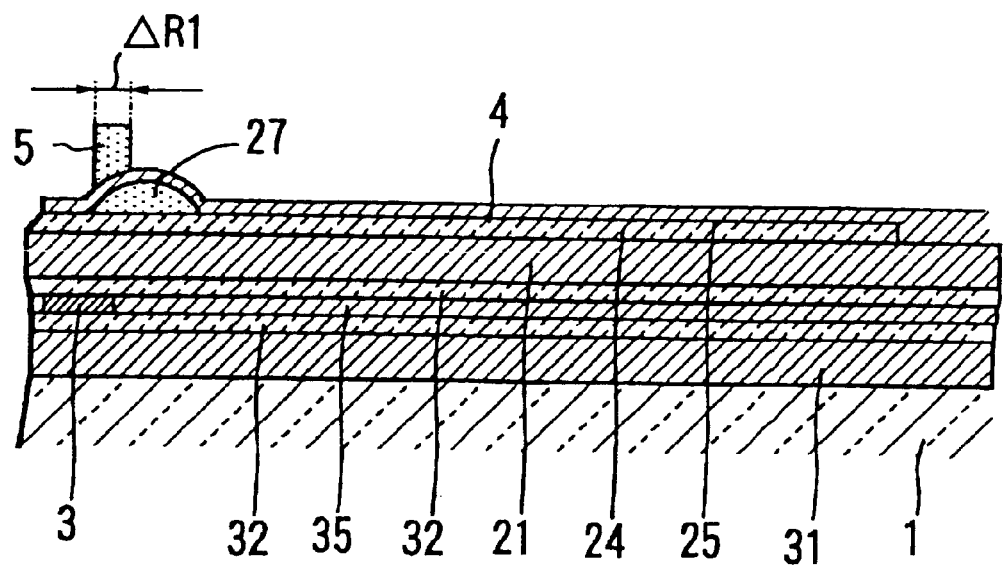
Figure 36:
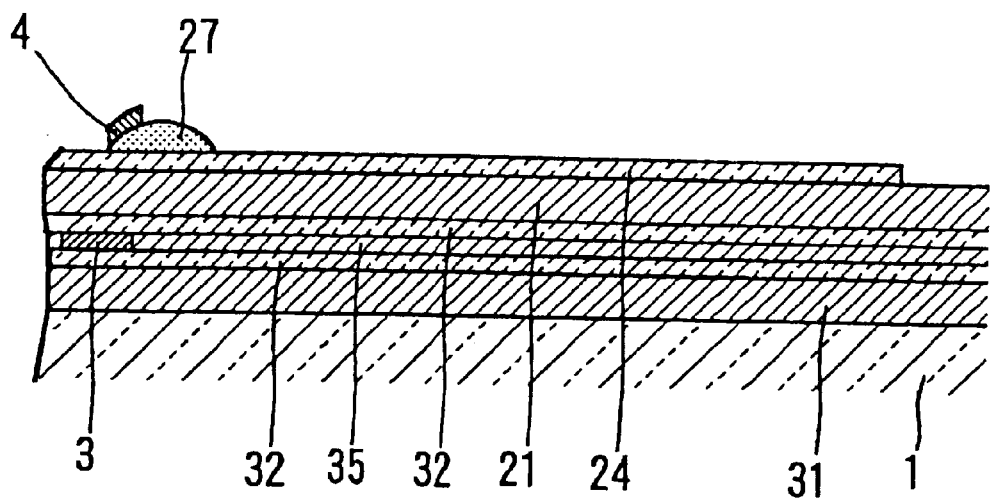

The antireflection film 4 is patterned by a photolithography process so that the remaining antireflection film can be placed on the second insulating film 27 in the side of the ABSs 13, 14. Concretely, by applying a photoresist on the antireflection film 4 and carrying out the photolitography process, the mask pattern 5 is formed on the second insulating film 27 as shown in FIG. 35. The mask pattern 5 is formed so that at least one of the length $\Delta R1$ in the backward direction from the throat height zero point TH0 and the width $\Delta W1$ thereof can be not more than the twice plate thickness of the second magnetic film 22. Moreover, it is not required that the end of the antireflection film 4 in the side of the ABSs 13, 14 coincide with the throat height zero point TH0. Thereafter, the part of the antireflection film 4 uncovered with the mask pattern is removed. The antireflection 4 made of the derivative of the polysulfone polymer or the maleomidevinyl copolymer can be easily removed by dry-etching such as ashing. Moreover, the antireflection film 4 made of the inorganic material such as TiN or DLC can be removed by dry-etching such as milling or RIE. Thereby, as shown in FIG. 36, the antireflection film 4 remains only on the insulating film 27. Since the shape of the mask pattern 5 is transcribed into the antireflection film 4, the antireflection film 4 is formed so that at least one of the length $\Delta R1$ in the backward direction from the throat height zero point and the width $\Delta W1$ thereof can be not more than the twice plate thickness of the second magnetic film 22.

Figure 37:
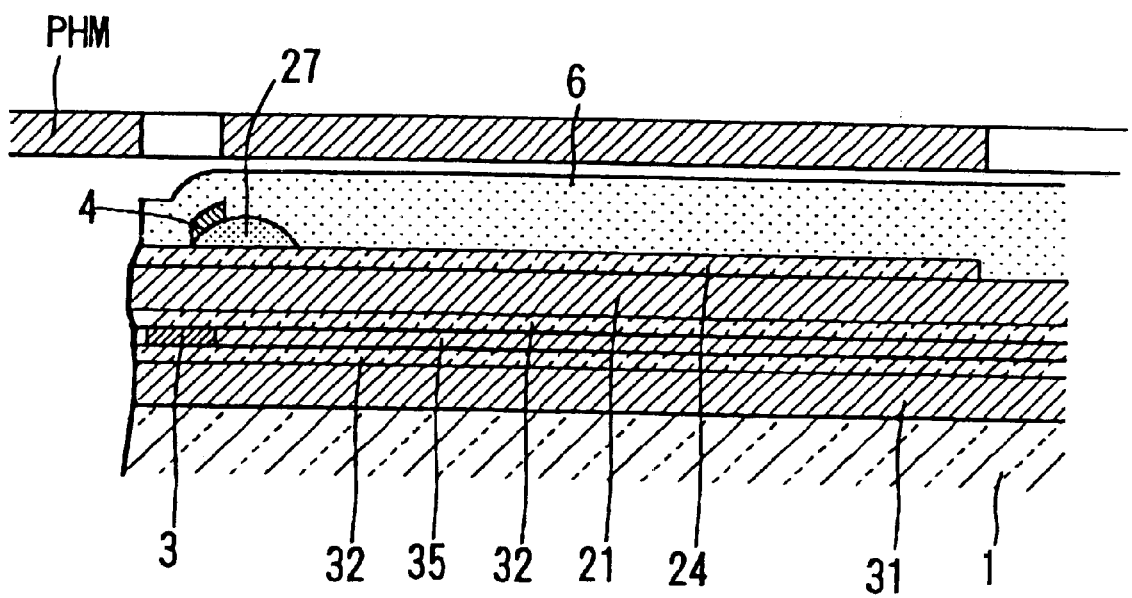
Figure 38:
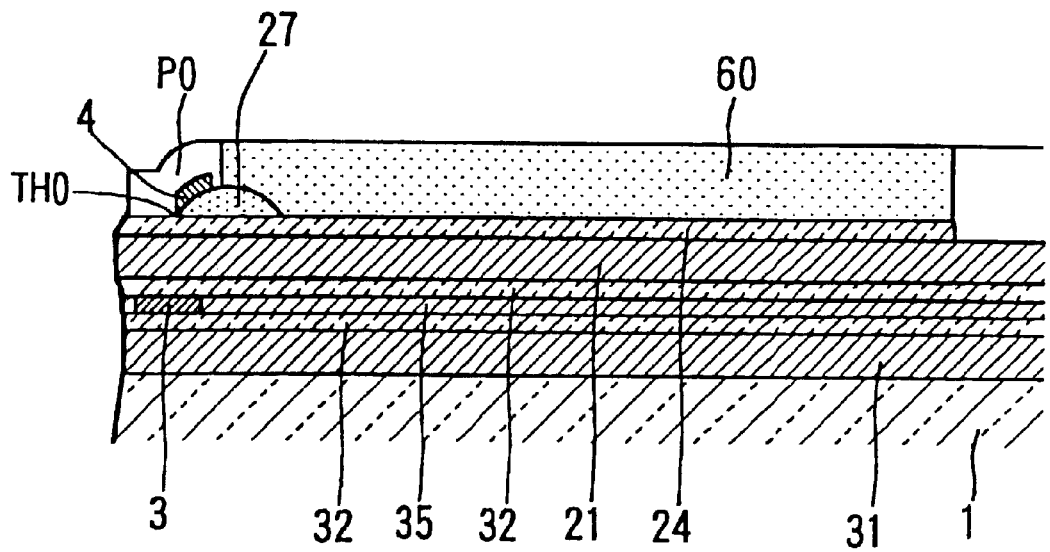

Subsequently, as shown in FIG. 37, the photoresist is formed so as to cover the antireflection film 4, and is exposed with the photomask PHM. Then, the photolithography process for the second pole portion 220 is carried out and as shown in FIG. 38, the resistframe 60 is formed. The remaining antireflection film 4 on the insulating film 27 to determine the throat height zero point almost never reflects the exposing light at the second insulating film 27 in the photolithography process for the photoresist 6 to form the second pole portion. Therefore, the exposed pattern of the second pole portion area P0 is almost defined by the exposing pattern of the photomask PHM, particularly. Consequently, the pattern of the pole portion area P0 can be formed in the high precise shape determined by the precision of the photolithography process. The antireflection film 4 made of the derivative of the polysulfone polymer or maleimidevinyl copolymer, TiN, or DLC has a small reflectance, and can form the pattern of the resistframe 60 corresponding to the pole portion area P0 higher precisely.

Figure 39:
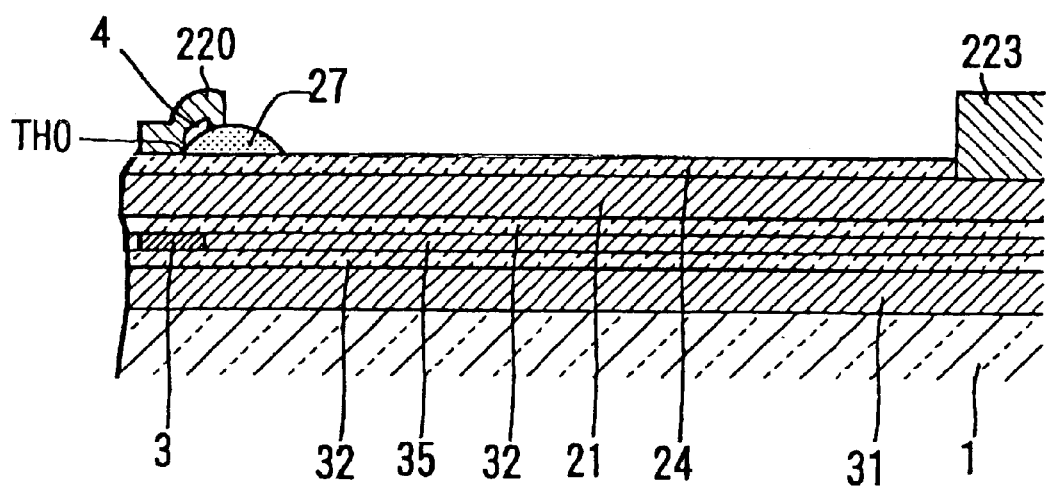
Figure 40:
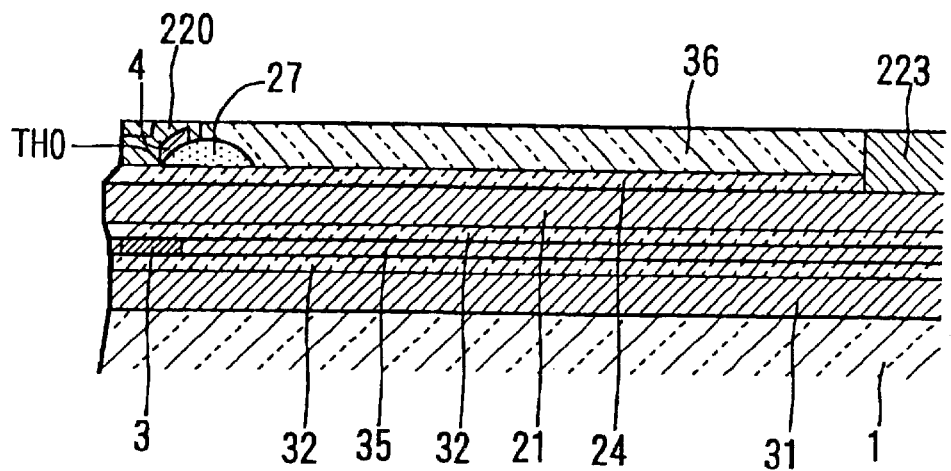

Subsequently, as shown in FIG. 39, the second pole portion 220 is formed in the pattern enclosed by the resistframe 60 so as to cover the antireflection film 4. The backward connecting part 223 may be formed at the same time. Thereafter, as shown in FIG. 40, the surfaces of the second pole portion 220 and the backward connecting part 223 are flattened by forming an insulating film 36 and polishing the film 36 through CMP or the like.

Figure 41:
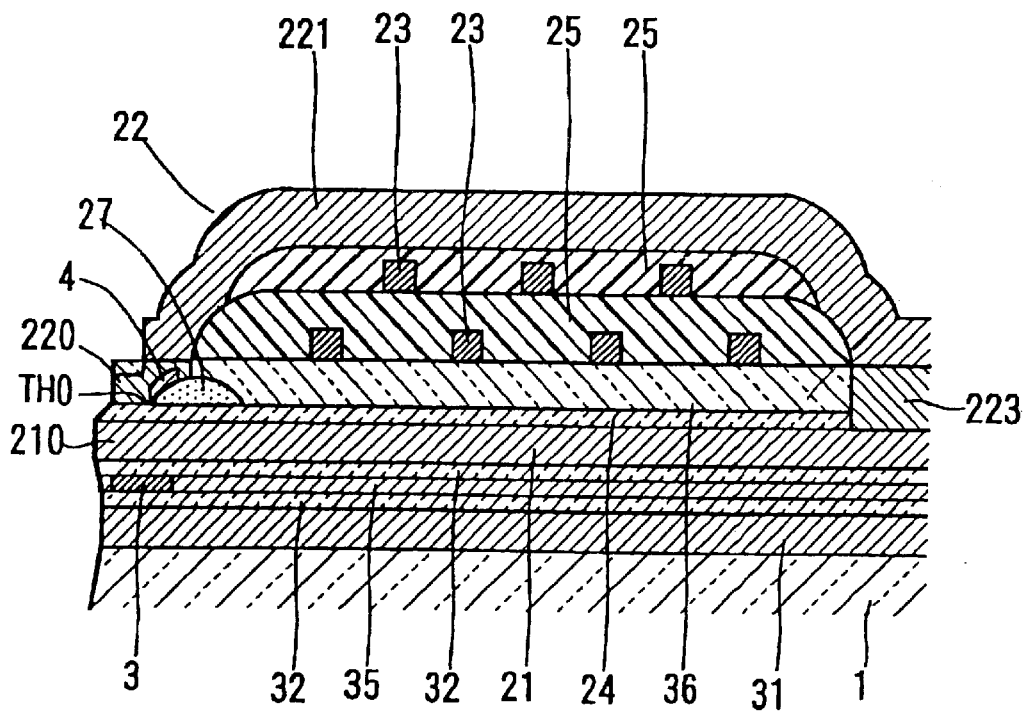
Figure 42:
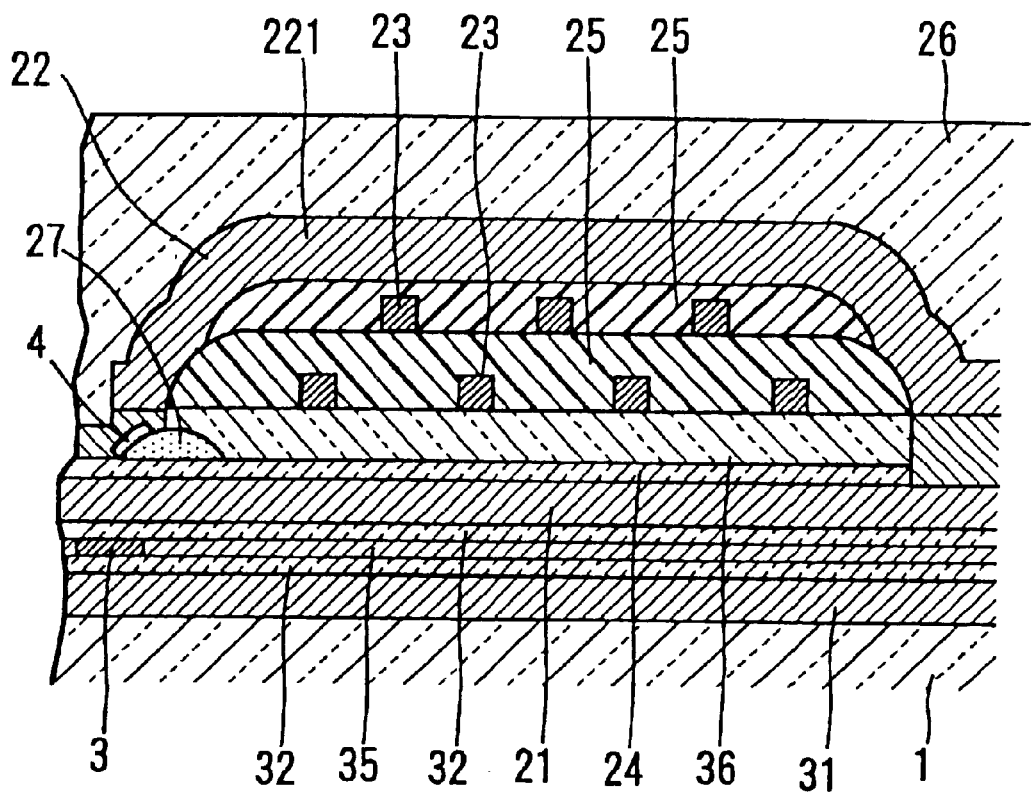

Next, the thin film coil 23, the first insulating film 25 and the second yoke portion 221 are formed as shown in FIG. 41, and the protection film 26 is formed as shown in FIG. 42.

This invention has been described in detail with reference to the above preferred concrete embodiments, but it is obvious for the ordinary person skilled in the art that various modifications can be made in its configuration and detail without departing from the scope of this invention.

As mentioned above, this invention can provide the following effects:

(a) A thin film magnetic head and a method for manufacturing the same, in which a magnetic film to be formed on an insulating film can be formed in a high precise pattern, can be provided.

(b) A thin film magnetic head and a method for manufacturing the same, in which a pole portion of a magnetic film to be formed in an insulating film can be formed in a high precise pattern, can be provided.

(c) A thin film magnetic head having a narrowed recording track width and a method for manufacturing the same can be provided.

What is claimed is:

1. A thin film magnetic head including a slider composed of a substrate and a thin film magnetic head element supported by the substrate, the thin film magnetic head element comprising a first magnetic member including a first pole portion and a first yoke portion, a second magnetic member including a second pole portion opposing to the first pole portion via a write gap film and constituting, with the first pole portion, an air bearing surface to oppose to a magnetic recording medium, and a second yoke portion magnetically connected to the first yoke portion in a remote position from the air bearing surface, a thin film coil of which part is surrounded by the first and second magnetic members, a coil support-insulating film to support the thin film coil, a throat height zero point-defining insulating film rising on the write gap film so as to define the throat height zero point, and an antireflection film between the rising-inclined portion of the throat height zero point-defining insulating film and the second pole portion of the second magnetic member.

2. A thin film magnetic head as defined in claim 1, wherein the coil support-insulating film and the throat height zero point-defining insulating film are composed of a common insulating film.

3. A thin film magnetic head as defined in claim 2, wherein the anti-reflection film is formed between the inclined portion of the common insulating film and the second magnetic member.

4. A thin film magnetic head as defined in claim 2, wherein the common insulating film is made of a photoresist.

5. A thin film magnetic head as defined in claim 2, wherein the second magnetic member having the second pole portion and the second yoke portion is composed of one magnetic film.

6. A thin film magnetic head as defined in claim 2, wherein the second pole portion and the second yoke portion are composed of different magnetic films, respectively, and the antireflection film is formed between the throat height zero point-defining insulating film and the magnetic film constituting the second pole portion.

7. A thin film magnetic head as defined in claim 1, wherein the coil support-insulating film and the throat height zero point defining insulating film are composed of different insulating films, respectively.

8. A thin film magnetic head as defined in claim 7, wherein the antireflection film is formed between the throat height zero point-defining insulating film and the second pole portion of the second magnetic member.

9. A thin film magnetic head as defined in claim 8, wherein the end of the magnetic film constituting the second pole portion is exposed to the air bearing surface, and the end of the insulating film constituting the coil support-insulating film in the side of the air bearing surface is receded from the air bearing surface.

10. A thin film magnetic head as defined in claim 1, wherein at least one of the length in the backward direction from the air bearing surface and the width in the antireflection film is not more than the twice plated thickness of the second magnetic member.

11. A thin film magnetic head as defined in claim 1, wherein a reading magnetoresistive effective element is formed so as to be supported by the substrate.

12. A thin film magnetic head as defined in claim 11, wherein the reading magnetoresistive effective element includes a spin valve film-structure.

13. A thin film magnetic head as defined in claim 11, wherein the reading magnetoresistive effective element is placed between a first and a second shield film, and the second shield film is composed of the first magnetic member.

14. A thin film magnetic head as defined in claim 1, wherein the antireflection film is placed permanently between the rising-inclined portion of the throat height zero point-defining insulating film and the second pole portion of the second magnetic member.

* * * * *